Oct. 5, 1965  H. G. FREEMAN  3,210,042

BALL VALVE SEAT

Filed July 29, 1964 3 Sheets-Sheet 1

Inventor:
Howard G. Freeman,
by Arthur D. Thomson
Attorney

Oct. 5, 1965   H. G. FREEMAN   3,210,042
BALL VALVE SEAT
Filed July 29, 1964   3 Sheets-Sheet 2

Inventor:
Howard G. Freeman
by Arthur D. Thomson
Attorney

Oct. 5, 1965    H. G. FREEMAN    3,210,042
BALL VALVE SEAT
Filed July 29, 1964    3 Sheets-Sheet 3
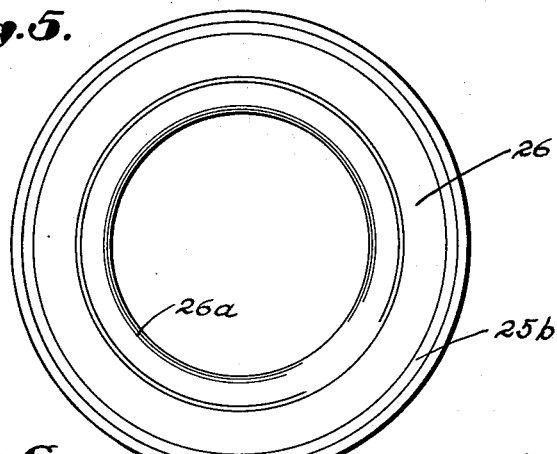
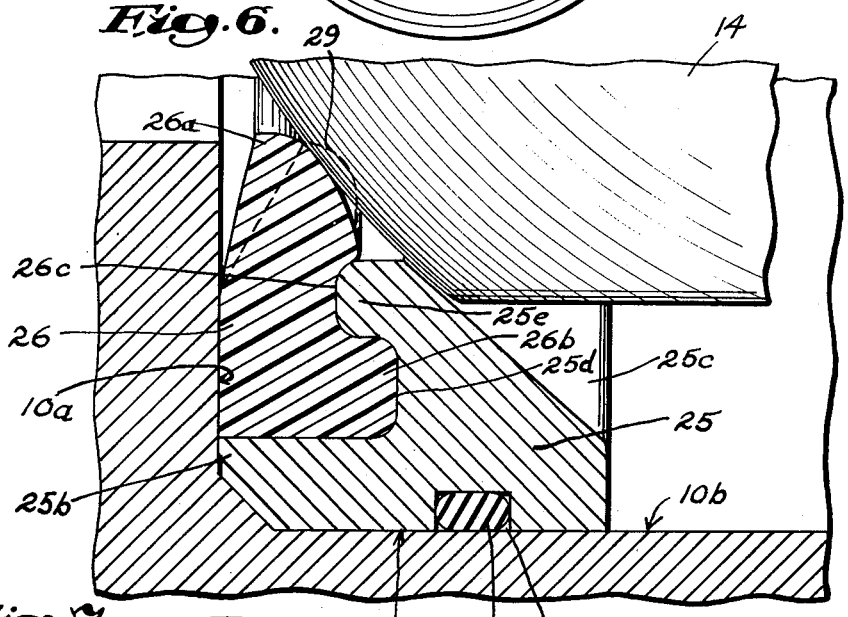
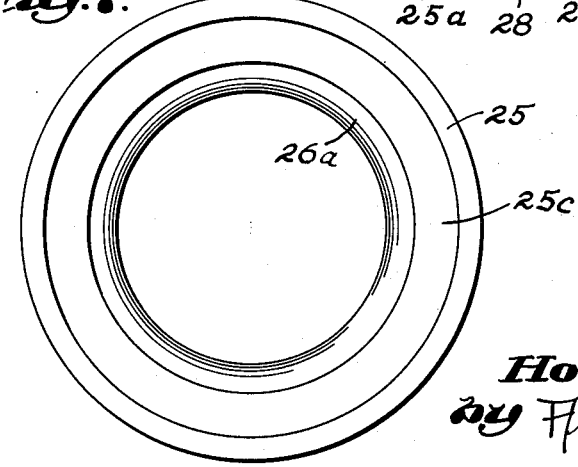
Inventor:
Howard G. Freeman
by Arthur D. Thomson
Attorney United States Patent Office 3,210,042
Patented Oct. 5, 1965

3,210,042
BALL VALVE SEAT
Howard G. Freeman, Worcester, Mass., assignor to Jamesbury Corp., Worcester, Mass., a corporation of Massachusetts
Filed July 29, 1964, Ser. No. 385,990
6 Claims. (Cl. 251—175)

This invention relates to ball valves and particularly to valves of the general type shown in my previous Patent No. 2,945,666, employing a seat ring with a body portion and a radially inwardly projecting flexible lip which engages the ball to form a seal. The present application is a continuation-in-part of my previous application Serial No. 166,768, filed January 17, 1962, now abandoned.

In valves of this general type the lip is designed to be initially flexed and is sufficiently flexible to form a seal under low pressure. As the pressure increases, the lip bends until, under full load, the ball seats on the solid body portion. The ring is ordinarily made in one piece of a material having a degree of elasticity suitable for the operating pressure range for which the valve is designed. It is essential to keep the total movement of the ball and lip within the elastic limit of the lip. It is difficult to design a one piece seal ring which will meet this requirement for some applications, for example, for valves subject to very high pressure or shock loads, especially if a tight seal is also required at low pressures. A material which is sufficiently elastic to provide a satisfactory seal under low pressure is likely to be too compressible and permit excessive travel of the ball under extreme load conditions, and may even has insufficient compressive strength to withstand the maximum load.

The principal object of this invention is to provide a valve seat for a ball valve which will withstand extremely high pressure and shock loads, and also will seal satisfactorily at low pressures. Another object is to provide a seat which does not produce excessive friction in opening and closing the valve.

The invention consists in general of a composite seat ring having a core of rigid material of high compressive strength and low compressibility, and a sleeve of more elastic material carrying a lip which engages the ball initially. Under full load conditions the ball seats against the core so that the major part of the load is carried by the core. The core and sleeve have interlocking portions which prevent rotation of the sleeve as a whole with respect to the core under axial load. Other objects, advantages, and novel features will be apparent from the following description.

In the drawings illustrating the invention:

FIG. 5 is a side elevation of a modification of the seat ring;

FIG. 6 is a fragmentary cross-section similar to FIG. 3 showing the modified seat of FIG. 5 installed in a valve; and FIG. 7 is a side elevation of the ring of FIG. 5 as seen from the opposite side.

Figure 1:
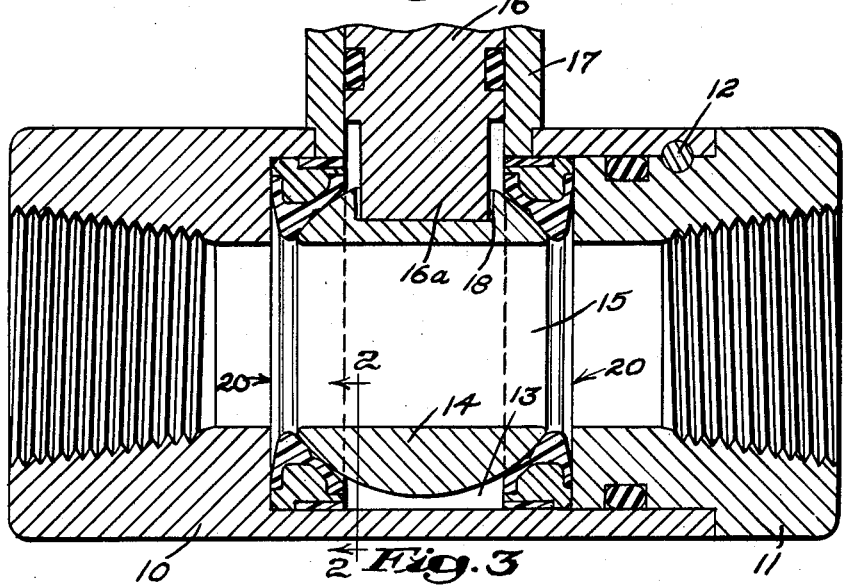
FIG. 1 is a cross-section of a ball valve equipped with seats constructed according to the invention.

The valve shown in FIG. 1, by way of example, has a casing consisting of two sections 10 and 11 secured together by pins 12 and defining a cylindrical valve chamber 13 in which a ball 14 is mounted. The ball has a through passage 15. A stem 16 is mounted in a bonnet 17 secured to the casing, and has a squared lower end 16a which is engaged in an oversized recess 18 in the ball.

Figure 3:
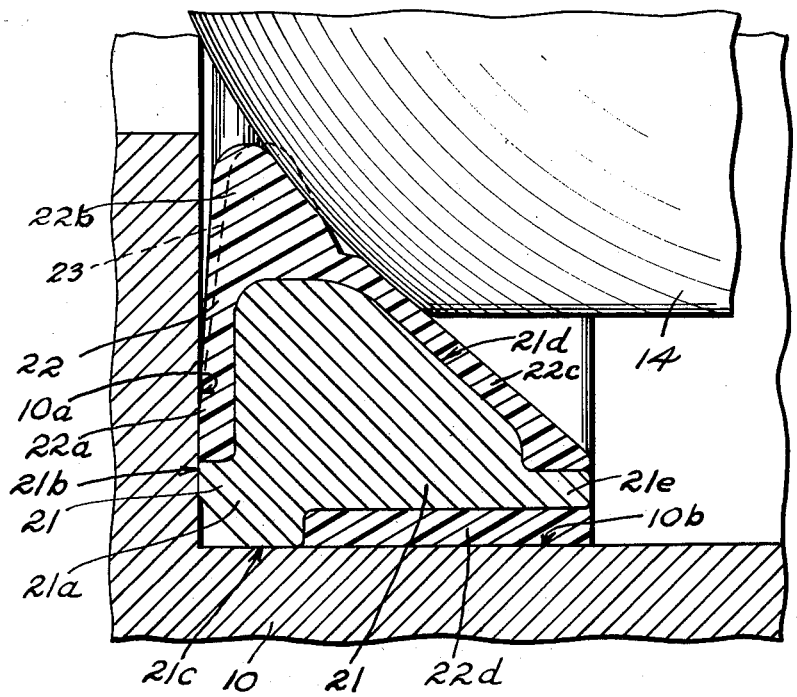
FIG. 3 is an enlarged fragmentary cross-section taken along line 3—3 of FIG. 2.
Figure 2:
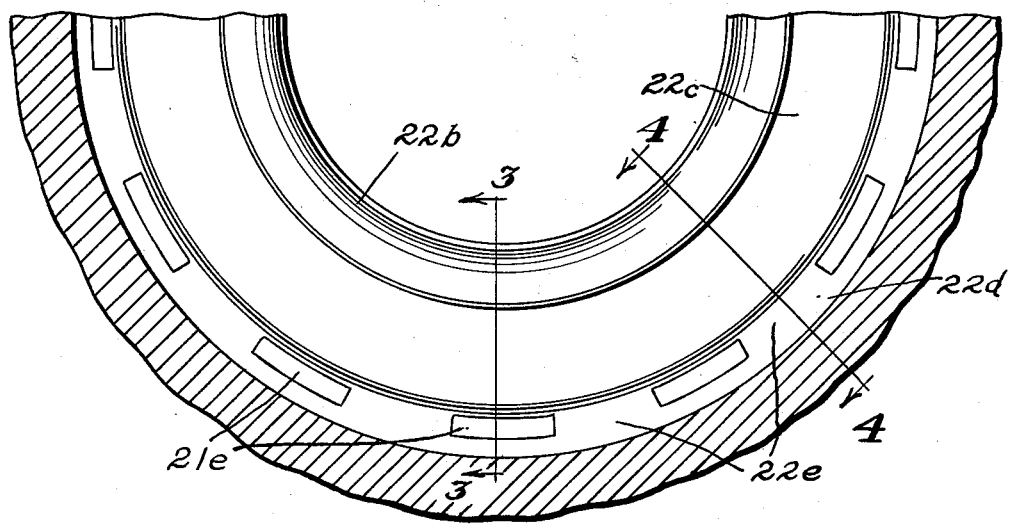
FIG. 2 is an enlarged fragmentary cross-section taken along line 2—2 of FIG. 1.
Figure 4:
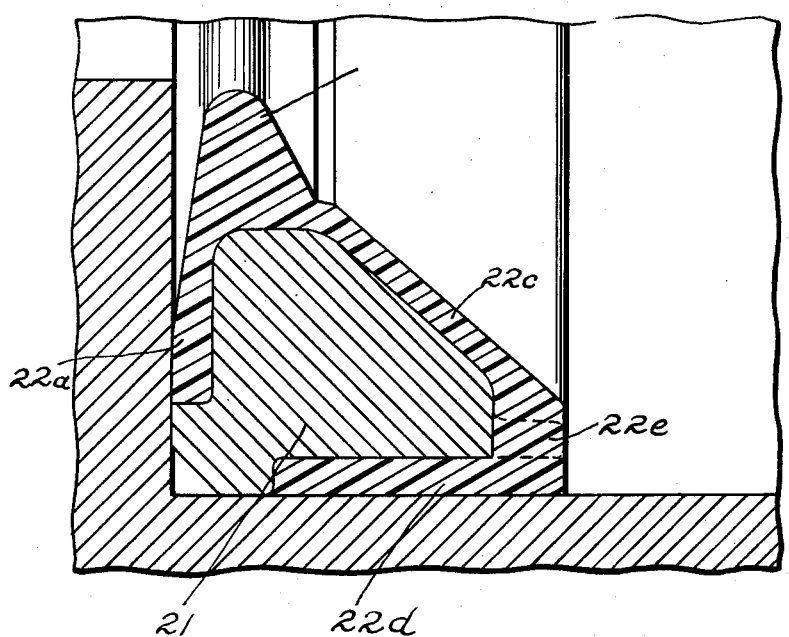
FIG. 4 is an enlarged fragmentary cross-section taken along line 4—4 of FIG. 2.

The ball is seated between two seat rings, generally indicated by the numeral 20, which are duplicates in construction but are disposed to face in opposite directions. As shown in detail in FIGS. 2, 3 and 4, the ring 20 consists of a core 21 of metal or similar rigid material, and a sleeve 22 of more flexible material, such as natural or synthetic rubber, nylon, or other plastic material.

The core 21 has a bead 21a having a radially disposed face 21b and an axially disposed face 21c which are seated on the end wall 10a and side wall 10b, respectively, of the valve chamber. The core also has a conical face 21d and a number of circumferentially spaced tabs 21e. The sleeve 22 is molded around the core and is formed with a flange 22a, disposed against wall 10a, a radially inwardly projecting lip 22b which engages the ball, a conical wall 22c overlying face 21d, and a cylindrical band 22d disposed between the core and wall 10b and connected to conical portion 22c by links 22e.

The lip 22b is initially molded to the configuration indicated by the dotted outline 23. The valve chamber 13 is designed to such dimensions that the lip is bent slightly when the ball and seat rings are assembled into the casing. Under full load (assuming the pressure is on the right side of the ball, as viewed in FIG. 3), the ball moves to the left until it seats on wall 22c, bending the lip 22b to the position shown in full line. Wall 22c is relatively thin, and is backed up by the core 21 in the region on which the ball bears. Even if sleeve 22 is made of highly compressible material, the movement of the ball to the left, after it has seated on wall 22c, is very slight. Any pressure load beyond that required to bend lip 22b to the full line position, is borne primarily by the rigid core 21 which also prevents further travel of the ball. Therefore, lip 22b cannot be stressed beyond the degree of bending at full load for which it is designed.

The sleeve may be made of a material of low coefficient of friction. As the entire contact surface for the ball is covered by the sleeve material, friction is thus kept to a minimum.

The form of seat ring shown in FIGS. 5 through 7 consists of a core 25, of rigid material, such as metal, and a sleeve 26 of more flexible material, such as rubber or flexible plastic. The core has cylindrical outer face 25a, which engages wall 10b of the housing, an extension 25b which engages wall 10a, and a conical surface 25c on which the ball seats under full load conditions. The core may have an external groove 27, in which an O-ring 28 is placed to insure a seal between the core and the casing. The sleeve has a radially inwardly projecting flexible lip 26a, which engages the ball to form a seal, and an axially extending bead 26b disposed alongside a groove 26c. Bead 26b is received in a groove 25d in the core, and the core has a bead 25e received in groove 26e, to provide an interlocking connection between the core and the sleeve.

The lip 26a is initially designed to the configuration of the dotted line 29 in FIG. 6 and is prestressed, or bent in the axial direction of the ring upon assembly of the ball and seat rings into the valve chamber, as in the case of rings 20. When the ball is in the closed position under pressure, lip 26a bends further until the ball seats on surface 25c. Once the ball is thus seated, the rigid core 25 prevents further movement of the ball and stressing of lip 26a under increasing pressure. The initial clearance between the ball and surface 25c is so designed that the stress on the lip remains within its elastic limit.

In the form of FIGS. 5 through 7, the contact between the ball and the core is essentially a line contact, as surface 25c of the relatively incompressible core is conical and the ball spherical. The area of contact is thus very small, and friction between the two is kept to a minimum. The lip, which has a larger contact area to provide a fluid seal, may be made of low frictional material.

It will be noted that, in both forms of the ring, a portion of the core is disposed concentrically between the ring axis and a portion of the sleeve. For example, in the first form, the right hand portion of the core 21 is concentrically surrounded by band 22d of the sleeve and, in the second form, bead 25e of the core is concentrically surrounded by bead 26b of the sleeve. Portions 22d and 26b of the respective sleeve are thus maintained in fixed position and provide an opposing force fir the twisting movement created (in the counter-clockwise direction in FIGS. 2 and 6) by pressure of the ball against the lips of the sleeves. The sleeve and core are thus held together by a positive mechanical interlock, and such adhesive bond as may exist between their adjoining surfaces is not depended on to carry stress.

It is understood that the materials for the core and the sleeve may be selected according to the use for which the valve is intended. The core may be made of steel for some uses, or of bronze, stainless steel, or other non-corrosive metals, for use with corrosive liquids. The sleeve may be made of natural or synthetic rubber, or of nylon, Teflon, and similar plastics which are non-reactive to the liquid or gas which is to be controlled by the valve. The term "flexible" is used in a relative sense. The flexibility of the sleeve material may range from that of soft rubber to that of molded nylon or Teflon, which is ordinarily considered a fairly rigid material, but, in any case, the sleeve material is more flexible and elastic than that of the core.

What is claimed is:

1. A ball valve comprising a casing having a valve chamber and inlet and outlet openings communicating therewith, said chamber having an end wall in which said outlet opening is disposed, a ball mounted in said chamber and having a fluid passage, means for turning said ball between an open position in which said passage is in communication with said openings and a closed position in which said passage is out of communication with said openings, and a unitary seat ring disposed against said wall around said outlet opening, said ring including a core of rigid material and a sleeve of material more elastic than that of said core, said sleeve having an axially flexible lip engaging said ball to form a seal therewith, said ball being movable toward said wall, and said lip being bendable to permit such movement, and said core having a first portion engaging said wall and a second portion disposed between said ball and said wall and all around said opening and initially spaced from said ball but adapted to limit the ball movement toward said wall, and said core and sleeve having interlocking portions adapted to prevent relative rotation therebetween due to axial load on said lip.

2. A ball valve as described in claim 1, said interlocking portions comprising a portion of the sleeve surrounding and engaging a portion of the core.

3. A ball valve as described in claim 1, said second core portion having a seat face spaced from said ball but engageable therewith when said lip is bent by a predetermined amount.

4. A ball valve as described in claim 1, said second core portion having a seat face and said sleeve having a thin wall portion interposed between said ball and said face, said ball being engageable with said sleeve wall portion when said lip is bent by a predetermined amount.

5. A ball valve as described in claim 1, said interlocking portions comprising an axially projecting bead on the core and an oppositely axially projecting bead on the sleeve surrounding the bead on the core.

6. A ball valve as described in claim 3, said core having circumferentially spaced axially projecting tabs and said interlocking portions comprising a band on said sleeve surrounding and engaging said core, said sleeve having a wall portion connected to said lip and links passing between said tabs and connecting said band to said wall portion.

No references cited

M. CARY NELSON, *Primary Examiner.*
MARTIN P. SCHWADRON, *Examiner.*